United States Patent
Mills et al.

(10) Patent No.: US 7,678,468 B2
(45) Date of Patent: Mar. 16, 2010

(54) COMPOSITION AND METHOD FOR THE ADDITION OF SATURATED SLIP AGENTS TO MULTILAYER POLYETHYLENE FILMS

(75) Inventors: Charles D. Mills, Orange, TX (US); James H. Addcox, Beaumont, TX (US)

(73) Assignee: Chevron Phillips Chemicals Company LP, The Woodlands, TX (US)

(*) Notice: Subject to any disclaimer, the term of this patent is extended or adjusted under 35 U.S.C. 154(b) by 1242 days.

(21) Appl. No.: 11/186,037

(22) Filed: Jul. 21, 2005

(65) Prior Publication Data

US 2007/0020472 A1 Jan. 25, 2007

(51) Int. Cl.
*B32B 27/32* (2006.01)
(52) U.S. Cl. .................... 428/516; 428/515
(58) Field of Classification Search ............ 428/515, 428/516
See application file for complete search history.

(56) References Cited

U.S. PATENT DOCUMENTS

| | | | |
|---|---|---|---|
| 3,891,587 A | | 6/1975 | Watts |
| 4,833,024 A | * | 5/1989 | Mueller ............... 428/349 |
| 4,956,212 A | | 9/1990 | Bekele |
| 5,981,047 A | | 11/1999 | Wilkie |
| 5,985,426 A | | 11/1999 | Wilkie |
| 6,210,764 B1 | * | 4/2001 | Hayes ................. 428/34.9 |
| 6,440,533 B1 | * | 8/2002 | Ray et al. ............. 428/172 |

FOREIGN PATENT DOCUMENTS

EP 0 471 571 A2 2/1992
WO WO 97/03113 1/1997

OTHER PUBLICATIONS

"AIR3-CT94-2480 Crambe abyssinica, a comprehensive programme—Workshop—Part 4—Utilisation," BioMatNet, pp. 1-8, Sep. 2004.
"Erucamide," ChemicalLand21.com, pp. 1-2, Aug. 2004.

(Continued)

*Primary Examiner*—D. S Nakarani
(74) *Attorney, Agent, or Firm*—Conley Rose, P.C.; Rodney B. Carroll; Cheryl L. Huseman (57) ABSTRACT

A multilayer polymer film comprising at least one core layer disposed between two skin layers, wherein at least one of the core layers, one of the skin layers, or both one of the core layers and one of the skin layers comprises a saturated organic fatty amide (SOFA) slip agent. A multilayer polymer film comprising an effective amount of a SOFA slip agent in at least one core layer such that the film exhibits blocking of equal to or less than about 75 grams. A method of packaging a product comprising providing a package fabricated from such films and placing the product in the package, wherein loose dust is not applied to the exterior of the package to reduce blocking. A method for the reduction of the presence of wax on the surface of a multilayer polymer film comprising adding a SOFA slip agent to a core layer of the film.

20 Claims, 2 Drawing Sheets

Diagram of multilayer polymer film

OTHER PUBLICATIONS

"COF," ASTM D 1894 ExxonMobil Chemical Company, pp. 1-3, Nov. 2001.

"MarFlexTM 5428 Low Density Polyethylene," MarFlex Polyethylene—Superior Flexible Packaging Resins, Chevron Phillips Chemical Company, LP, 1 pg., Jun. 2004.

"MarFlexTM 7235B Hexene Linear Low Density Polyethylene," MarFlex Polyethylene—Superior Flexible Packaging Resins, Chevron Phillips Chemical Company, LP, 1 pg., Jun. 2004.

Swanson, C.L., et al., "Meadowfoam Monoenoic Fatty Acid Amides as Slip and Antiblock Agents in Polyolefin Film," Journal of Applied Polymer Science, 1993, vol. 49, pp. 1619-1624.

Maltby, Adam, et al., "Slip Additives for Film Extrusion," Polymers, Laminations & Coatings Conference, 1996, pp. 25-45.

Coupland, Keith, et al., "Modification of the Surface Properties of Polyethylene Plastomer Films by The Use of Additives," Journal of Plastic Film & Sheeting, Apr. 1997, vol. 13, pp. 142-149.

Ramirez, Maria X., et al., "AFM Characterization of Surface Segregated Erucamide and Behenamide in Linear Low Density Polyethylene Film," American Chemical Society, 2002, vol. 2, No. 1, pp. 9-12.

"Products," Croda Worldwide, Sep. 1, 2004, 1 pg.

* cited by examiner

Figure 1. Diagram of multilayer polymer film

Fig. 2

COMPOSITION AND METHOD FOR THE ADDITION OF SATURATED SLIP AGENTS TO MULTILAYER POLYETHYLENE FILMS

FIELD OF THE INVENTION

The present invention relates in general to multilayer polyethylene films. More particularly, this invention relates to the addition of saturated organic fatty amides, alone or in combination with unsaturated organic fatty amides, to reduce blocking in multilayer polyethylene films.

BACKGROUND OF THE INVENTION

Multilayer polymer films (MPFs) used in packaging as either single sheets to wrap products or converted into bags into which products are loaded must meet demanding criteria from both the industrial and end-user perspectives. These criteria may include the clarity or gloss of the film, the strength of the film and the frictional nature of the film. Since the packaging process typically involves automated mechanical methods that can include the high-speed moving, positioning, and opening of the MPF in preparation for wrapping or loading of the product, another property critical to the performance of the MPFs in the packaging process is the degree to which the adjacent film surfaces adhere to each other. The term used to describe the magnitude of adherence of adjacent film surfaces is "blocking." A high level of blocking means that adjacent film surfaces tend to adhere to one another or other surfaces. Conversely, low blocking means that adjacent film surfaces do not easily adhere to one another or other surfaces. High levels of film blocking can slow or interrupt the packaging process and are therefore considered undesirable. Thus, a need exists for films having improved blocking properties while retaining the desired aesthetic qualities useful for marketing the final product to the consumer.

SUMMARY OF THE INVENTION

In an aspect, a multilayer polymer film is disclosed comprising at least one core layer disposed between two skin layers, wherein at least one of the core layers, one of the skin layers, or both one of the core layers and one of the skin layers comprises a saturated organic fatty amide (SOFA) slip agent.

In an aspect, a multilayer polymer film is disclosed comprising an effective amount of a SOFA slip agent in at least one core layer such that the film exhibits blocking of equal to or less than about 75 grams.

In an aspect, a method of packaging a product is disclosed comprising providing a package fabricated from the disclosed films and placing the product in the package, wherein loose dust is not applied to the exterior of the package to reduce blocking.

In an aspect, a method for the reduction of the presence of wax on the surface of a multilayer polymer film is disclosed comprising adding a SOFA slip agent to a core layer of the film.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific aspects disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE INVENTION

Figure 1:
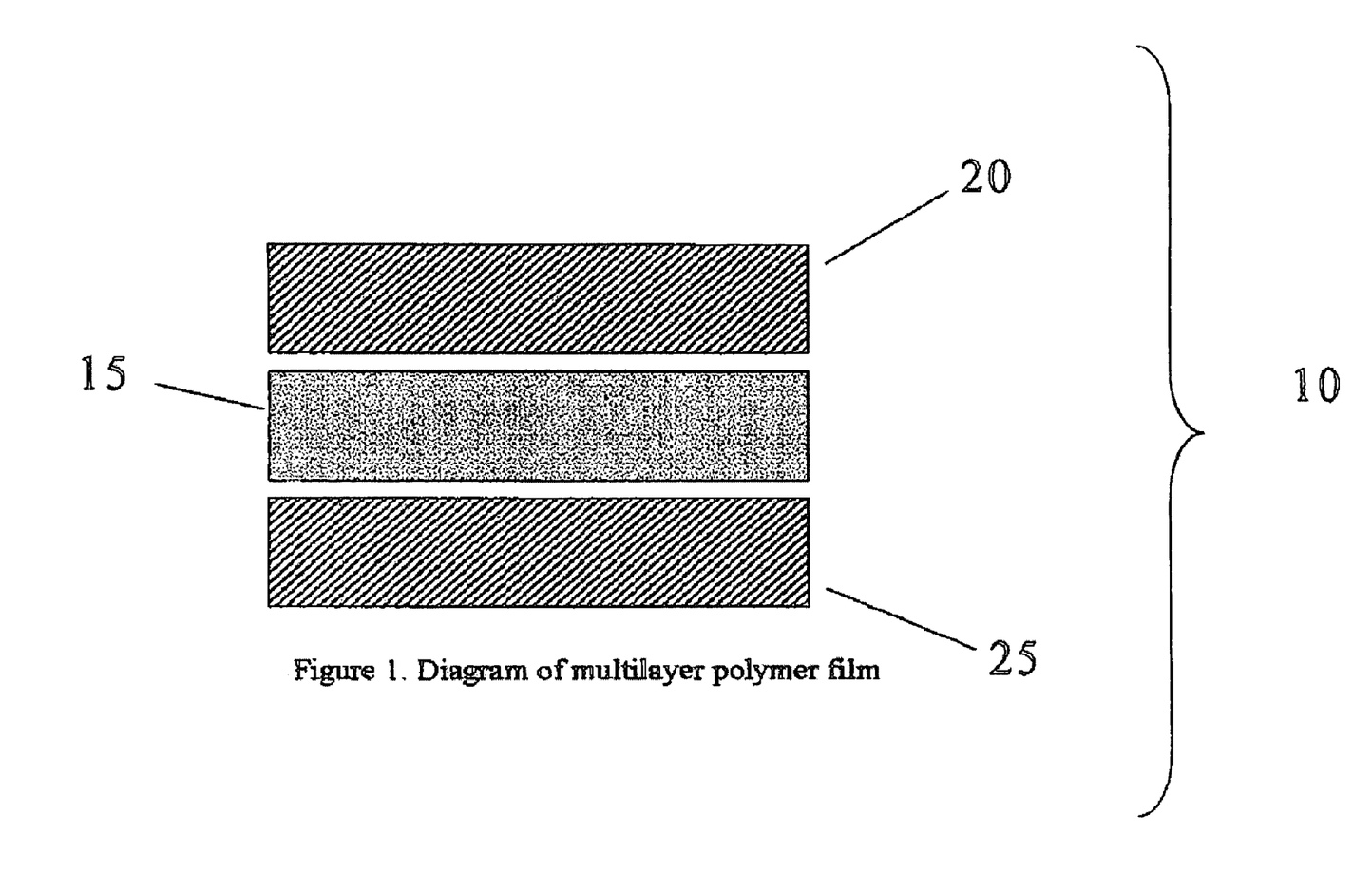
FIG. 1 is a diagram of a multilayer polyethylene film.

Referring to an aspect shown in FIG. 1, a MPF 10 can comprise at least three layers: at least one core layer 15 disposed between an outer skin layer 20 and an inner skin layer 25. The term "skin layer" refers to each of the outermost layers 20, 25 of the film. The inner skin layer 25 is typically in contact with a packaged product such as a bakery product, and the outer skin layer is typically printed or otherwise decorated. The term "core layer" refers to one or more layers 15 disposed between the skin layers. The core layer may comprise one layer or multiple layers. In aspects having multiple core layers, the term "central core layer" refers to an innermost or primary core layer having one or more "intermediate core layers" disposed between the central core layer and the outer skin layer 20, one or more intermediate core layers disposed between the central core layer and the inner skin layer 25, or both. Typically, an equal number of intermediate core layers are present on either side of the central core layer. The intermediate core layers may be the same as or different than the central core layer. For example the intermediate core layers may be of like or varying thickness and/or composition than the central core layer. In an aspect, the central core layer and the intermediate core layers have about the same size and/or composition. In an aspect, multiple core layers of like composition and thickness may be laminated or otherwise function together such that they form a functional equivalent of a single, uniform core layer. As used herein the terms "core layer" and "multiple core layers" includes the central core layer and any intermediate core layers, when present.

In an aspect, a MPF 10 comprises three layers as is shown in FIG. 1: a single core layer 15 disposed between an outer skin layer 20 and an inner skin layer 25. In an aspect, the MPF 10 comprises five layers: a core layer 15 disposed between the outer skin layer 20 and the inner skin layer 25, wherein the core layer 15 further comprises a central core layer equally disposed between 2 intermediate core layers. In an aspect, the MPF may comprise seven layers: a core layer 15 disposed between the outer skin layer 20 and the inner skin layer 25, wherein the core layer 15 further comprises a central core layer equally disposed between 4 intermediate core layers. In various aspects, any suitable number of core layers may be disposed between the skin layers 20 and 25. The remainder of the disclosure will focus on the three layer aspect of FIG. 1, with the understanding that multiple core layers may be used as appropriate.

The MPF 10 may have a thickness of from about 0.5 mils to about 5.0 mils (0.001 inch), alternatively from about 0.90 mils to about 3.0 mils. MPFs produced according to the present disclosure may have blocking from about 100 to about 500 grams, alternatively from about 100 to about 300 grams, alternatively equal to or less than about 75 grams, alternatively from about 25 to about 50 grams.

Each skin layer of the MPF may have a thickness of from about 5 to about 45% of the total MPF thickness. For example, the outer skin layer 20 may have a thickness of from about 5 to about 45% of the thickness of MPF 10, the inner skin layer 25 may have a thickness of from about 5 to about 45% of the thickness of MPF 10, and the one or more core layers 15 may comprise the remainder of the thickness of MPF 10, e.g., from about 10 to about 90% of the thickness of MPF 10.

The skin layers may comprise homopolymer, copolymer, or blends thereof. In an aspect, the skin layers comprise low density polyethylene (LDPE), for example LDPE having a high degree of long-chain branching and a density ranging from about 0.915 to about 0.935 g/cc. A LDPE suitable for use in the fabrication of the skin layers of the MPF may have a melt index of from about 0.20 to about 4.0 g/10 min. Suitable LDPE and methods for preparing same are well known to one with ordinary skill in the art. For example, the LDPE may be made by an autoclave or tubular high pressure polymerization processes. A representative example of suitable LDPE is MARFLEX 5428 available from Chevron Phillips Chemical Company LP of The Woodlands, Tex. In an aspect, the LDPE (e.g., MARFLEX 5428) has physical properties as set forth in Table 1.

TABLE 1

| | English | SI | Method |
|---|---|---|---|
| Nominal Resin Properties | | | |
| Density | — | 0.93 g/cm$^3$ | ASTM D1505 |
| Melt Index, 190 C./2.16 Kg | — | 2.2 g/10 min | ASTM D1238 |
| Melting Point | 232° F. | 111° C. | ASTM D3418 |
| Vicat Softening Temperature | 209° F. | 99° C. | ASTM D1525 |
| Process Aide | — | None | — |
| Antiblock (Al silicate), ppm | 10000 | 10000 | — |
| Slip (erucamide), ppm | 1000 | 1000 | — |
| Nominal Blown Film Properties at 1.25 mil[1] | | | |
| Haze | 6.5% | 6.5% | ASTM D1003 |
| Gloss, 60° | 122 | 122 | ASTM D2457 |
| COF | 0.15 | 0.15 | ASTM D1894 |
| Dart | — | 95 g/mil | ASTM D1709 |
| Elmendorf Tear MD | — | 215 g/mil | ASTM D1922 |
| Elmendorf Tear TD | — | 280 g/mil | ASTM D1922 |
| WVTR | 0.90 g/100 in$^2$/day | 14 g/m$^2$/day | ASTM F1249 |
| OTR | 420 cm$^3$/100 in$^2$/day | 6300 cm$^2$/m$^2$/day | ASTM D3985 |

[1]Produced using a smooth bore extruder at a rate of 7 lb/in die cast film line In an aspect, one or both of the skin layers, e.g., LDPE, may contain a slip agent, for example, one or more unsaturated organic fatty amides (UOFA). Suitable UOFAs for use as slip agents are well known to one with ordinary skill in the art. Without limitation, representative examples include the amides of erucic acid (e.g., erucamide), oleic acid (e.g., oleamide) or combinations thereof available from Croda, Compton, Polyvel Inc. and Winter Sun Chemicals. The amount of UOFA slip agent present in a given skin layer may be from about 50 ppm to about 1500 ppm, alternatively, from about 50 ppm to about 1000 ppm, alternatively, from about 300 ppm to about 600 ppm.

In an aspect, one or both of the skin layers, e.g., LDPE, may contain as a slip agent a saturated organic fatty amide (SOFA) in addition to or in lieu of the UOFA. In an aspect, the SOFA is behenamide. The amount of SOFA slip agent present in a given skin layer may be from about 50 ppm to about 1500 ppm, alternatively, from about 50 ppm to about 1000 ppm, alternatively, from about 300 ppm to about 600 ppm.

In an aspect, the skin layers comprise LDPE and behenamide; alternatively LDPE and erucamide; alternatively, LDPE, behenamide, and erucamide. Addition of one or more slip agents to one or both of the skin layers may be in addition to or in lieu of the addition of one or more slip agents to the one or more core layers.

The one or more core layers may comprise homopolymer, copolymer, or blends thereof. In an aspect, the one or more core layers comprise linear low density polyethylene (LLDPE) or a blend of LDPE and LLDPE. The LDPE may be the same or different as the LDPE in the skin layers. The one or more core layers may comprise from about 5 to about 100% LLDPE, alternatively from about 30 to about 100% LLDPE, alternatively from about 50 to about 100% LLDPE, with the remainder core layer comprising LDPE and/or other polymer. LLDPEs may be produced by the addition of olefin comonomers into linear polyethylene to produce polyethylene with a density between about 0.900-0.935 g/cm. Suitable LLDPE and methods for preparing same are well known to one with ordinary skill in the art and without limitation may include, gas phase, solution, or slurry polymerization. In an aspect, the LLDPE for use in the core layer may have a density in the range of from about 0.900 to about 0.935 g/ml and a melt index of from about 0.2 to about 5.0 g/10 min.

A representative example of a suitable LLDPE is MARFLEX 7235B available from Chevron Phillips Chemical Company LP of The Woodlands, Tex. In an aspect, the LLDPE (e.g. MARFLEX 7235B) has physical properties as set forth in Table 2.

TABLE 2

| | English | SI | Method |
|---|---|---|---|
| Nominal Resin Properties | | | |
| Density | — | 0.924 g/cm$^3$ | ASTM D1505 |
| Melt Index, 190 C./2.16 Kg | — | 3.5 g/10 min | ASTM D1238 |
| Process Aide | None | None | — |
| Antiblock, ppm | None | None | — |
| Slip (erucamide), ppm | 1000 | 1000 | — |
| Nominal Cast Film Properties at 1.25 mil[1] | | | |
| Haze | 4% | 4% | ASTM D1003 |
| Gloss, 60° | 140 | 140 | ASTM D2457 |
| COF | 0.1 | 0.1 | ASTM D1894 |
| Dart | — | 70 g/mil | ASTM D1709 |
| Elmendorf Tear MD | — | 150 g/mil | ASTM D1922 |

TABLE 2-continued

|  | English | SI | Method |
|---|---|---|---|
| Elmendorf Tear TD | — | 450 g/mil | ASTM D1922 |
| Tensile Strength at Break MD | 5000 psi | 34 MPa | ASTM D882 |
| Tensile Strength at Break TD | 3200 psi | 22 MPa | ASTM D882 |
| Tensile Strength Elongation at Break MD | 500% | 500% | ASTM D882 |
| Tensile Strength Elongation at Break TD | 700% | 700% | ASTM D882 |
| 1% Secant Modulus MD | 31000 psi | 214 MPa | ASTM D882 |
| 1% Secant Modulus TD | 33000 psi | 228 MPa | ASTM D882 |

(1)Produced on 2.5 in extruder 24:1 L/D 40 mil Die Gap 500 F. Melt Temperature
(2)The resin used in this example was a gas phase LLDPE.

In an aspect, one or more of the core layers, where multiple core layers are present, may contain a slip agent, for example, one or more unsaturated organic fatty amides (UOFA), as described previously. In an aspect, one or more core layers comprise erucamide. The amount of UOFA slip agent present in the one or more core layers may be from about 50 ppm to about 1500 ppm, alternatively, from about 50 ppm to about 1000 ppm, alternatively, from about 300 ppm to about 600 ppm.

In an aspect, one or more of the core layers, where multiple core layers are present, may contain as a slip agent a saturated organic fatty amide (SOFA) in addition to or in lieu of the UOFA. In an aspect, the one or more core layers comprise behenamide. The SOFA slip agent may be added to the core layer in amounts effective to reduce the blocking of the MPF to less than about 200 grams. For example, the amount of SOFA slip agent present in the one or more core layers may be from about 50 ppm to about 1500 ppm, alternatively, from about 50 ppm to about 1000 ppm, alternatively, from about 300 ppm to about 600 ppm.

A SOFA slip agent in the core layer, alone or in combination with a UOFA slip agent, may act to reduce the blocking at the skin layers without substantial migration of the SOFA slip agent to the surface of the skin layers. In some aspects, the SOFA slip agent is behenamide which when added to the core layer may dramatically reduce the blocking at the skin layers without substantial migration of behenamide to the surface of the skin layers. Without wishing to be limited by theory, it is believed that behenamide acts to retard the migration of lower molecular weight molecules or wax from the core layers to the surface of the skin layers thus reducing the overall blocking properties of the MPF.

Addition of one or more slip agents to the one or more core layers may be in addition to or in lieu of the addition of one or more slip agents to the skin layers.

In an aspect, the one or more core layers of the MPF may comprise a slip agent blend of one or more unsaturated organic fatty amides (UOFA) such as erucamide and one or more saturated organic fatty amides (SOFA) such as behenamide. The SOFA and UOFA slip agent blends may be added to the core layer in amounts effective to reduce blocking of the MPF in comparison to the same MPF without the SOFA and UOFA slip agents.

In an aspect, the core layer or layers of the MPF comprises one or more SOFAs (e.g., behenamide), alone or in combination with one or more UOFAs (e.g., erucamide), and the previously disclosed LLDPE or LDPE/LLDPE blend. In an aspect, the core layer or layers of the MPF comprises one or more SOFAs (e.g., behenamide), alone or in combination with one or more UOFAs (e.g., erucamide), and the previously disclosed LLDPE or LDPE/LLDPE blend, and the skin layers comprise LDPE and optionally one or more UOFAs, SOFAs, or combinations thereof. In an aspect, the core layer or layers of the MPF comprises behenamide and erucamide and the previously disclosed LLDPE or LDPE/LLDPE blend, and the skin layers comprise LDPE and erucamide. In an aspect, the core layer or layers of the MPF comprises erucamide and the previously disclosed LLDPE or LDPE/LLDPE blend, and the skin layers comprise LDPE, behenamide, and erucamide.

In an aspect, one or more layers of the MPF may optionally comprise one or more antiblock agents. In an aspect, one or both skin layers and/or one or more core layers may comprise one or more antiblock agents. The antiblock agent may be present in an amount ranging from about 50 to 12,000 ppm. Examples of antiblock agents include silica dioxide, talc, aluminum silicon dioxide, stearamide, magnesium silicates, and combinations thereof. Antiblock agents may reduce the degree to which adjacent film surfaces adhere to each other as evinced by a reduction in measured parameters such as grams for blocking. While effective as antiblock agents, the addition of increasing levels of minerals to the polymer tends to worsen the optical properties of the film resulting in reduced clarity and gloss, and a packaging film having decreased aesthetic quality. Certain antiblock agents when used at elevated concentration may also have an adverse effect on the tensile strength and impact strength properties of the film, resulting in product spillage and loss. Thus, the use of antiblock agents may be avoided or minimized in order to avoid such problems.

MPFs as described herein may be made by any suitable manufacturing process known in the art to produce coextruded blown film, coextruded cast film, and other processes such as extrusion coating and laminations. Through the use of these various processing techniques, MPFs can be used in the packaging of food products and consumer goods. For example, MPFs may be used to package bread (e.g., blown and cast films), paper products (e.g., extrusion coating, cast and blown film), and applesauce (thermoformed sheet).

In certain aspects, the MPFs or packaging made therefrom may be prepared for and printed by various techniques. One such preparation technique is corona treatment, which is the discharge of a static electrical current across the surface of an MPF to prepare it for printing or lamination. Corona treatment of the MPF surface may be required in order for typical ink formulations or other substrates to adhere to the film surface. The process of corona treating an MPF modifies the surface by increasing the surface energy. Corona treatment is typically conducted during the production or printing of the film and the amount or level of corona treatment can be varied. The surface energy of corona treated MPF's typically ranges from about 35 to 45 dynes.

The MPFs described herein may be used to construct packaging containers having reduced blocking and thereby eliminating the need to dust the MPF or add excessive amounts of antiblock agents to achieve low blocking performance. Dusting typically involves the application of a loose material such as cornstarch to the surface of MPF's to further reduce the blocking. The use of a loose dust is disadvantageous in terms of added cost, cleanliness of and around packaging equipment, diminished aesthetic properties of the film, and other unwanted side effects.

In an aspect, a product is automatically or manually placed into a packaging container constructed from a MPF as described herein. The packaging container may be opened automatically, for example via a stream of air, or manually; the product may be placed inside; and the package may close automatically or manually. Given that the MPF disclosed herein have low blocking, the packaging process may be carried out without the addition of loose dust (e.g., cornstarch) to reduce blocking. In an aspect, the product may be a perishable item, alternatively, the product may be a food item and alternatively, the product may be a bakery item.

EXAMPLES

The invention having been generally described, the following examples are given as particular aspects of the invention and to demonstrate the practice and advantages thereof. It is understood that the examples are given by way of illustration and are not intended to limit the specification of the claims in any manner.

Example 1

Example 1 is an evaluation of the effect of a combined erucamide/behenamide slip addition on a LDPE/LLDPE/LDPE coextrusion. A series of 1.20 mil coextrusions containing erucamide/behenamide combination were manufactured on a Black Clawson chill cast line utilizing MARFLEX PE 5428 (LDPE) in the skin layers of the construction and MARFLEX 7235B (LLDPE) in the core layer. (Table 3) In this and all subsequent examples these resins will be referred to as either an LDPE or LLDPE for MARFLEX PE 5428 and MARFLEX 7235B, respectively. The LDPE is a 2.2 g/10 min melt index resin containing 1000 ppm of erucamide slip agent and 10000 ppm of antiblock. The antiblock was aluminum silicate known commercially as MINEX and available from Unimin Corp. The LLDPE is a 3.5 g/10 min melt index, 0.9235 g/cc density resin containing 1000 ppm of erucamide slip agent. During extrusion, various concentrations of a 5% behenamide slip masterbatch, identified as CE505B, were added to either the skin or core layers of the chill cast film construction resulting in overall behenamide concentration in the film ranging from 0 to 640 ppm, as indicated.

TABLE 3

| SAMPLE | LAYER | | | TOTAL BEHINAMIDE SLIP LEVEL IN FILM (ppm) |
|---|---|---|---|---|
| | Skin 1 | Core | Skin 2 | |
| | LAYER DISTRIBUTION | | | |
| | 20 | 60 | 20 | |
| A | 5428 | 7235B | 5428 | 0 |
| B | 99.6% 5428 + 0.4% CE505B | 7235B | 99.6% 5428 + 0.4% CE505B | 80 |
| C | 99.2% 5428 + 0.8% CE505B | 7235B | 99.2% 5428 + 0.8% CE505B | 160 |
| D | 98.4% 5428 + 1.6% CE505B | 7235B | 98.4% 5428 + 1.6% CE505B | 320 |
| E | 96.8% 5428 + 3.2% CE505B | 7235B | 96.8% 5428 + 3.2% CE505B | 640 |
| F | 5428 | 99.47% 7235B + 0.53% CE505B | 5428 | 160 |

Each sample manufactured during the run was corona discharge treated to two dyne levels, 38 and 40 dynes/cm. Block, Coefficient of Friction (COF), and optics tests were then performed on the resultant films in accordance with the referenced ASTM methods.

TABLE 4

| | | Sample | | | | | |
|---|---|---|---|---|---|---|---|
| | | A | B | C | D | E | F |
| Behenamide Level | Skins | 0 | 200 | 400 | 800 | 1600 | 0 |
| | Core | 0 | 0 | 0 | 0 | 0 | 265 |
| | Total in Film | 0 | 80 | 160 | 320 | 640 | 160 |
| Block | 100 F./38 Dynes | 13.5 | 11.4 | 11.1 | 8 | 7 | 9 |
| | 125 F./38 Dynes | 65.6 | 70.5 | 66 | 49 | 31 | 35 |
| | 100 F./40 Dynes | 19.2 | 15.8 | 19 | 15 | 11 | 15 |
| | 125 F./40 Dynes | 106 | 95 | 80 | 70 | 62 | 61 |
| COF (T to T) 1 Hr Conditioning | Kinetic/38 Dynes | 0.436 | 0.485 | 0.478 | 0.473 | 0.500 | 0.383 |
| | Kinetic/40 Dynes | 0.573 | 0.550 | 0.586 | 0.579 | 0.574 | 0.527 |
| | Static/38 Dynes | 0.515 | 0.542 | 0.545 | 0.548 | 0.540 | 0.448 |
| | Static/40 Dynes | 0.597 | 0.590 | 0.611 | 0.615 | 0.608 | 0.580 |
| COF (T to T) 24 Hrs Conditioning | Kinetic/38 Dynes | 0.204 | 0.219 | 0.198 | 0.187 | 0.167 | 0.186 |
| | Kinetic/40 Dynes | 0.290 | 0.260 | 0.280 | 0.235 | 0.190 | 0.261 |
| | Static/38 Dynes | 0.230 | 0.257 | 0.216 | 0.202 | 0.185 | 0.222 |
| | Static/40 Dynes | 0.329 | 0.279 | 0.290 | 0.265 | 0.223 | 0.292 |
| COF (UnT to UnT) 1 Hr Conditioning | Kinetic/38 Dynes | 0.319 | 0.361 | 0.373 | 0.363 | 0.320 | 0.251 |
| | Kinetic/40 Dynes | 0.325 | 0.367 | 0.371 | 0.392 | 0.338 | 0.271 |
| | Static/38 Dynes | 0.230 | 0.257 | 0.216 | 0.202 | 0.185 | 0.222 |
| | Static/40 Dynes | 0.329 | 0.279 | 0.290 | 0.265 | 0.223 | 0.292 |
| COF (UnT to UnT) 24 Hrs Conditioning | Kinetic/38 Dynes | 0.127 | 0.139 | 0.140 | 0.144 | 0.145 | 0.116 |
| | Kinetic/40 Dynes | 0.137 | 0.143 | 0.146 | 0.151 | 0.143 | 0.122 |
| | Static/38 Dynes | 0.130 | 0.143 | 0.145 | 0.149 | 0.159 | 0.128 |
| | Static/40 Dynes | 0.152 | 0.148 | 0.161 | 0.164 | 0.161 | 0.136 |
| Haze | 38 Dynes | 7.47 | 6.87 | 6.94 | 6.90 | 6.69 | 7.49 |

Haze indicates the degree to which a film has reduced clarity or cloudiness as determined in accordance with ASTM-D-1003. The COF has been described previously and is determined in accordance with ASTM D-1894.

As shown in Table 4 the addition of behenamide in amounts as low as 400 ppm to the LDPE skin layers (or 160 ppm of the total composition), resulted in a 25% reduction in the treat to treat blocking tendency of the 40 dyne/cm treated film when it was subjected to a blocking temperature of 125° F. Treat to treat (T to T) refers to the blocking observed between corona-treated sides of a film. Corona treatment, as discussed previously, results in an increased level of blocking. In conventional processing, a film is subjected to corona treatment by passing an electrode over the film surface. This process leaves one side of the film treated and one side untreated. Table 4 also refers to untreated to untreated (UnT to UnT) blocking. The greatest blocking is expected when two treated sides are in contact. Increasing the level of behenamide added to the skin layers to 1600 ppm or 640 ppm in the total composition yielded a 42% improvement in the 125° F. blocking tendency of the film.

The results also showed that adding the behenamide to the core layer of the MPF instead of the skin layers appeared to be more effective in reducing the blocking tendency of the film. As shown in Table 4, for a total addition level of 160 ppm of behenamide in a film treated to 40 dynes/cm and at a blocking temperature of 125° F., a 43% reduction in blocking tendency was achieved when the behenamide was added to the core compared to only a 25% improvement when the behenamide was added to the skins at the same concentration.

Example 2

Example 2 is an evaluation of a LDPE/(LDPE+LLDPE)/LDPE coextruded construction containing a combined erucamide/behenamide slip package and increased LLDPE content against a commercially produced bread bag packaging film. A series of 1.18 mil 5 layer coextruded chill east films were produced on a commercial scale chill cast extrusion line using LDPE in the skin layers and a blend of LDPE and LLDPE in the core layers. Behenamide was added to the core layers of samples 1 (S1) and 2 (S2) during extrusion using a 5% behenamide masterbatch (CE505B) as shown in Table 5.

TABLE 5

|  |  |  | Film Sample | | | | |
|---|---|---|---|---|---|---|---|
|  |  |  | S1 | S2 | C1 | C2 | C3 |
| Description | | | Experimental | Experimental | Control | Control | Control |
| Skin Layer Resin | | | MARFLEX 5428 | MARFLEX 5428 | MARFLEX 5428 | MARFLEX 5428 | MARFLEX 5428 |
| Core Layers | | | 70% MARFLEX 7235B + 28% MARFLEX 5428 + 2% CE505B | 70% MARFLEX 7235B + 29% MARFLEX 5428 + 1% CE505B | 60% MARFLEX 7235B + 40% MARFLEX 5428 | 60% MARFLEX 7235B + 40% MARFLEX 5428 | 60% MARFLEX 7235B + 40% MARFLEX 5428 |
| Layer Distribution | Outside Skin | % | | | 12.5 | | |
|  | Core Layers | % | | | 75 | | |
|  | Inner Skin | % | | | 12.5 | | |
| Film Thickness | | mils | | | 1.18 | | |

The outside skin layer of each of the film samples was corona treated to a 37 dynes/cm dyne level. Samples were tested for block, COF, optical properties and mechanical strength properties as determined in accordance with the referenced ASTM methods

TABLE 6

|  |  |  |  | S1 | S2 | C1 | C2 | C3 |
|---|---|---|---|---|---|---|---|---|
| Behenamide Addition | | Total in Film | ppm | 750 | 373 | 0 | 0 | 0 |
| Haze | | | % | 7.27 | 7.3 | 7.18 | 6.73 | 6.74 |
| Gloss | 60 deg | Side 1 | | 114 | 109 | 110 | 112 | 112 |
|  |  | Side 2 | | 118 | 114 | 115 | 117 | 117 |
| Elmendorf Tear | | MD | g/mil | 143 | 135 | 232 | 176 | 167 |
|  |  | TD | g/mil | 510 | 541 | 342 | 335 | 325 |
| PPT | | MD | N | 13.32 | 13.24 | 12.77 | 12.93 | 12.22 |
|  |  | TD | N | 19.46 | 16.64 | 17.31 | 17.93 | 17.4 |
| Tensile @ Break | | MD | psi | 3276 | 3353 | 3136 | 3554 | 3567 |
|  |  | TD | psi | 2420 | 2338 | 1778 | 2283 | 2375 |
| Elongation | | MD | % | 279 | 317 | 236 | 308 | 293 |
|  |  | TD | % | 592 | 587 | 536 | 559 | 577 |
| 1% Secant Modulus | | MD | psi | 25850 | 26900 | 26200 | 26500 | 25458 |
|  |  | TD | psi | 33540 | 31800 | 30000 | 30600 | 30700 |
| COF | Treat Side | Kinetic | | 0.105 | 0.12 | 0.115 | 0.104 | 0.109 |
|  |  | Static | | 0.133 | 0.144 | 0.141 | 0.117 | 0.14 |
|  | Untreat Side | Kinetic | | 0.145 | 0.129 | 0.131 | 0.126 | 0.131 |
|  |  | Static | | 0.183 | 0.155 | 0.159 | 0.154 | 0.156 |
| Block | Treat Side | 100 F. | grams | 9 | 14 | 18 | 29 | 19 |
|  |  | 115 F. | grams | 18 | 42 | 56 | 60 | 69 |
|  |  | 125 F. | grams | 41 | 104 | 171 | 185 | 170 |

Gloss is a measure of the relative luster of the film surface as determined in accordance with ASTM D-2457. The Elmendorf tear is the force required to tear, by propagation, a notched film sample in either the machine direction (MD) or the transverse direction (TD) as determined in accordance with ASTM D-1922. PPT refers to a method for determination of the average force to propagate tearing through a specified length of plastic film or nonrigid sheeting as determined in accordance with ASTM D-1922. Tensile strength at break and tensile break strength elongation both indicate the degree of deformation of the material at the point of rupture and are determined in accordance with ASTM D-882. The percentage secant moduli specifications refer to the ratio of stress to strain deformation as determined in accordance with ASTM D-882. The results demonstrate that the addition of behenamide to the core layers of the construction in combination with the erucamide in the core and skin layers reduces the blocking tendency of the multilayer polymer film even with a higher LLDPE content in the core layer. The results also show that the addition of the behenamide or erucamide did not significantly affect the optical, strength or COF characteristics of the film.

Example 3

Example 3 is an evaluation of dusted and undusted MPF bread bags containing a combined erucamide/behenamide slip package and increased LLDPE content as described in Example 2 against a commercially produced bread bag packaging film. Certain of the films described in Example 2 were converted into standard commercial bread bags using typical processes for the application. This included printing, conversion into bags, and then placing the bags on standard commercial wickets. Both dusted and undusted bags were produced during the bag conversion process.

Figure 2:
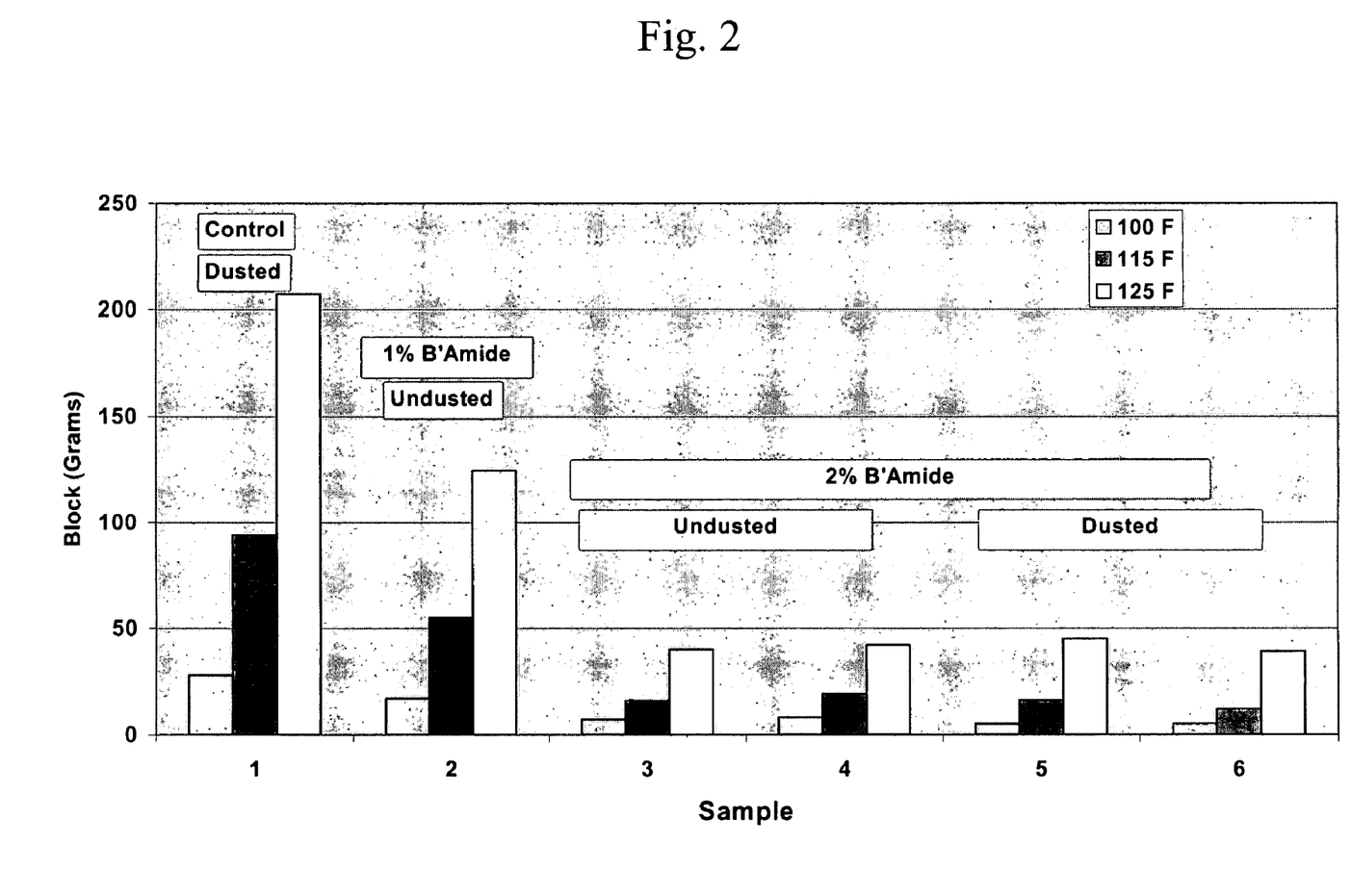
FIG. 2 is a graphical representation of blocking as a function of temperature.

FIG. 2 is a graph of the blocking in the MPF as a function of the amount of behenamide added, the usage (storage) temperature, and whether the bag was undusted or dusted with cornstarch. Referring to FIG. 2, in the absence of behenamide, a corona treated MPF exhibits blocking in the range of approximately 25 grams at 100° F. that increases dramatically to over 200 grams at a exposure temperature of 125° F. The addition of 1% behenamide (i.e., S2 from Example 2) to the core layer of the corona treated polymer film, Sample 2 of FIG. 2, in the absence of dust, has a blocking of less than 20 grams at a usage temperature of 100° F. while at 125° F. the blocking has increased to approximately 125 grams. The presence of behenamide at 2% (i.e., S1 from Example 1) in the corona treated film, whether in the presence, Samples 5 and 6, or absence, Samples 3 and 4, of cornstarch, maintains a blocking of less than 50 grams at exposure temperatures between 100° F. and 125° F.

While several aspects of the invention have been shown and described, modifications thereof can be made by one skilled in the art without departing from the spirit and teachings of the invention. The aspects described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an aspect of the present invention. Thus, the claims are a further description and are an addition to the disclosed aspects of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What we claim is:

1. A multilayer polymer film comprising at least one core layer disposed between two skin layers, wherein at least one of the core layers comprises a saturated organic fatty amide (SOFA) slip agent, wherein at least one of the skin layers consists of low density polyethylene, optionally an unsaturated organic fatty amide (UOFA) slip agent, and optionally an antiblock agent.

2. The film of claim 1 wherein the SOFA slip agent comprises behenamide.

3. The film of claim 1 wherein the SOFA slip agent is present in amounts ranging from about 50 ppm to about 1500 ppm.

4. The film of claim 1 further comprising an UOFA slip agent.

5. The film of claim 4 wherein the UOFA slip agent comprises an amide of oleic acid, erucic acid, or any combination thereof.

6. The film of claim 4 wherein the UOFA slip agent is present in amounts ranging from about 50 ppm to about 1500 ppm.

7. The film of claim 1 wherein the core layer comprises linear low density polyethylene or a blend of low density polyethylene and linear low density polyethylene.

8. The film of claim 1 wherein the core layer comprises from about 30 to about 100 weight percent linear low density polyethylene.

9. The film of claim 1 wherein both skin layers consist of low density polyethylene.

10. A multilayer polymer film comprising:
a plurality of skin layers consisting of low density polyethylene, optionally an unsaturated organic fatty amide (UOFA) slip agent, and optionally an antiblock agent, wherein the low density polyethylene has a density from about 0.915 g/cm$^3$ and 0.935 g/cm$^3$; and
at least one core layer comprising an effective amount of a SOFA slip agent such that the film exhibits blocking of equal to or less than about 75 grams.

11. The film of claim 10 wherein the SOFA slip agent comprises behenamide.

12. The film of claim 10 wherein the at least one core layer comprises from about 30 to about 100 weight percent of linear low density polyethylene.

13. The film of claim 10 further comprising a UOFA slip agent in one or more of the skin layers, one or more of the core layers, or combinations thereof.

14. An end-use article constructed from the film of claim 10.

15. A multilayer polymer film consisting essentially of at least one core layer disposed between two skin layers, wherein the core layer comprises a saturated organic fatty amide (SOFA) slip agent, and wherein the skin layers consist of branched low density polyethylene and an antiblock agent.

16. The film of claim 15 wherein the two skin layers consist of branched low density polyethylene having a density from about 0.915 g/cm$^3$ to about 0.935 g/cm$^3$ and optionally an unsaturated organic fatty amide (UOFA) slip agent, and wherein the SOFA slip agent comprises behenamide.

17. The film of claim 16 wherein the core layer comprises linear low density polyethylene and branched low density polyethylene, and wherein the two skin layers and the core layer comprise erucamide.

18. The film of claim 17 wherein the core layer comprises from about 30 to about 99 weight percent linear low density polyethylene.

19. The film of claim 18 wherein the behenamide is present in an amount ranging from about 50 ppm to about 1500 ppm.

20. The film of claim 19 exhibiting blocking of equal to or less than about 75 grams.

\* \* \* \* \*